No. 885,194. PATENTED APR. 21, 1908.
G. W. SPONABLE.
GEAR.
APPLICATION FILED APR. 2, 1906.

WITNESSES:
Chas. J. Jones.
Chas. H. Young.

INVENTOR
George W. Sponable
BY
Hoyt Parsons
ATTORNEYS

UNITED STATES PATENT OFFICE.

GEORGE W. SPONABLE, OF SYRACUSE, NEW YORK, ASSIGNOR TO THE BROWN-LIPE GEAR COMPANY, OF SYRACUSE, NEW YORK, A CORPORATION OF NEW YORK.

GEAR.

No. 885,194.  Specification of Letters Patent.  Patented April 21, 1908.

Application filed April 2, 1906. Serial No. 309,246.

*To all whom it may concern:*

Be it known that I, GEORGE W. SPONABLE, of Syracuse, in the county of Onondaga and State of New York, have invented a certain new and useful Gear, of which the following is a specification.

My invention has for its object the production of a gear, which can be readily moved laterally into engagement with another gear; and to this end, it consists in the novel combinations and features hereinafter set forth and pointed out in the claims.

In describing this invention, reference is had to the accompanying drawing, in which like characters designate corresponding parts in all the views.

Figure 1:
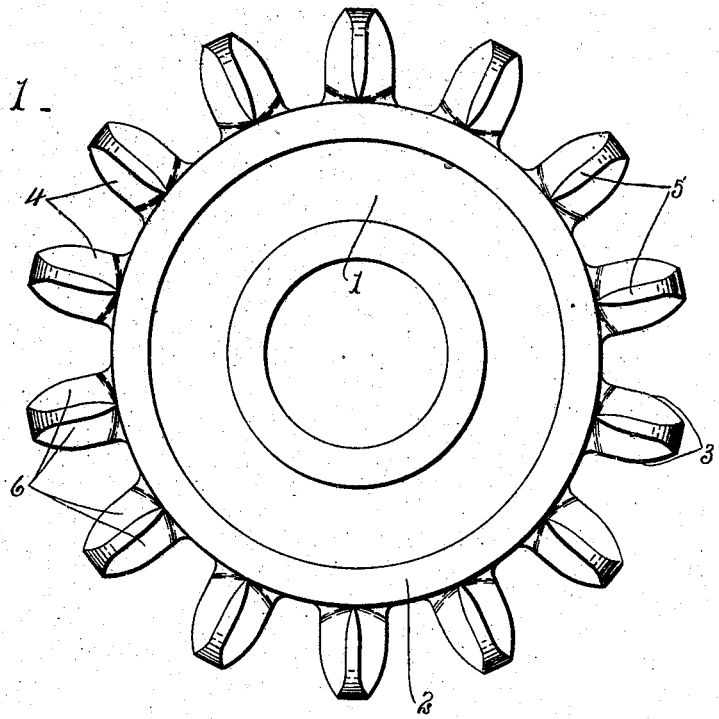
Figure 2:
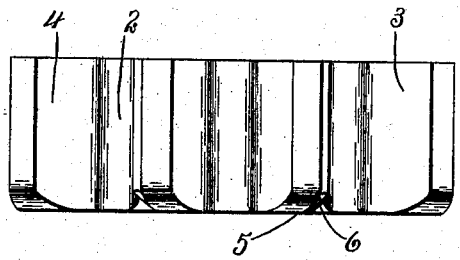
Figure 3:
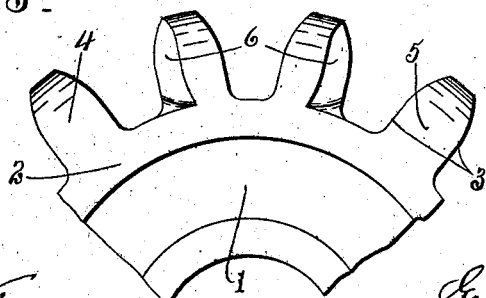

Figure 1 is a face view of a gear embodying my invention. Figs. 2 and 3 are, respectively, plan and face view of a part of a gear having opposite portions of two of its teeth formed in accordance with my invention.

The body 1, the rim 2, and the front and rear sides 3 of the teeth 4 of my gear may all be of any desirable form, size and construction. Corresponding ends of the teeth 4 are formed with substantially flat and convex surfaces 5, 6 extending in a substantially radial direction, the flat surfaces 5 being arranged substantially midway between the sides of the teeth, and receding toward the apexes of the teeth and the convex surfaces 6 diverging from the surfaces 5 towards said sides 3, said surfaces 6 on each tooth also converging toward each other as they approach the apex of the tooth and also as they approach the base of the tooth.

Although I have shown but one end of each tooth as formed with the surfaces 5, 6, it is apparent that if desired, opposite ends of each tooth may be so formed.

In the preferable construction of my gear, the convex surface 6 at one portion of the end of one tooth as the convex surface adjoining the rear side and at the opposite portion of the end of another tooth as the convex surface adjoining the front side, Fig. 2, have a common axis, or same center of curvature, being usually cut or shaped simultaneously by the same rotary internally toothed tool, as described in my pending application, Sr. No. 311,019 filed April 11, 1906, and consequently, said surfaces diverge from each other in substantially the same curved line. It is apparent, however, that the convex surface 6 of one tooth and the opposite surface 6 of a tooth separated from the first-named tooth by one or more teeth may have a common axis, if desired.

Gear teeth having their ends constructed as described, facilitate the lateral movement of a gear into engagement with another gear, and are not unduly weakened by the formation of the convex surfaces 6.

What I claim is:—

1. A gear having teeth formed with convex end surfaces extending substantially in a radial direction and the axis of said surfaces extending at an inclined angle to the axis of the gear so that the end surfaces of each tooth diverge toward the front and rear sides of the tooth, and also converge toward each other as they approach the apex of the tooth, substantially as and for the purpose set forth.

2. A gear having teeth formed with substantially flat, and convex end surfaces, the flat end surface of each tooth receding toward the apex of the tooth and the convex end surfaces extending substantially in a radial direction, the convex end surfaces of each tooth diverging toward the end and rear sides of the tooth and converging toward each other as they approach the apex of the tooth, substantially as and for the purpose described.

3. A gear having teeth formed with substantially flat, and convex end surfaces, the flat end surface of each tooth receding toward the apex of the tooth and the convex end surfaces extending substantially in a radial direction, the convex end surfaces of each tooth diverging toward the end and rear sides of the tooth and converging toward each other as they approach the apex of the tooth, and also as they approach the base of the tooth, substantially as and for the purpose specified.

4. A gear having teeth formed with convex end surfaces extending substantially in a radial direction and diverging towards the front and rear sides of the teeth, the convex surfaces of each tooth also converging toward each other as they approach the base of the tooth, substantially as and for the purpose described.

5. A gear having teeth formed with convex end surfaces extending substantially in a radial direction and diverging towards the front and rear sides of the teeth, the convex surfaces of each tooth also converging toward each other as they approach the apex of the tooth, and also as they approach the base of the tooth, substantially as and for the purpose set forth.

In testimony whereof, I have hereunto signed my name in the presence of two attesting witnesses, at Syracuse, in the county of Onondaga, in the State of New York, this 30th day of March, 1906.

GEORGE W. SPONABLE.

Witnesses:
S. DAVIS,
E. K. SEEMILLER.